(12) United States Patent
Weers et al.

(10) Patent No.: US 10,513,662 B2
(45) Date of Patent: Dec. 24, 2019

(54) FUNCTIONALIZED ALDEHYDES AS $H_2S$ AND MERCAPTAN SCAVENGERS

(71) Applicant: Baker Hughes, a GE company, LLC, Houston, TX (US)

(72) Inventors: Jerry J. Weers, Richmond, TX (US); Soma Chakraborty, Houston, TX (US); Vaithilingam Panchalingam, Friendswood, TX (US)

(73) Assignee: Baker Hughes, a GE company, LLC, Houston, TX (US)

( * ) Notice: Subject to any disclaimer, the term of this patent is extended or adjusted under 35 U.S.C. 154(b) by 0 days.

(21) Appl. No.: 15/882,794

(22) Filed: Jan. 29, 2018

(65) Prior Publication Data

US 2018/0216013 A1 Aug. 2, 2018

Related U.S. Application Data

(60) Provisional application No. 62/453,789, filed on Feb. 2, 2017.

(51) Int. Cl.
| | | |
|---|---|---|
| *C10G 21/16* | (2006.01) | |
| *C10L 3/10* | (2006.01) | |
| *B01D 53/52* | (2006.01) | |
| *C02F 1/20* | (2006.01) | |
| *B01D 53/14* | (2006.01) | |
| *C02F 101/10* | (2006.01) | |
| *C02F 1/26* | (2006.01) | |

(52) U.S. Cl.
CPC ......... *C10G 21/16* (2013.01); *B01D 53/1468* (2013.01); *B01D 53/1493* (2013.01); *B01D 53/52* (2013.01); *C02F 1/20* (2013.01); *C10L 3/103* (2013.01); *B01D 2251/10* (2013.01); *B01D 2252/20* (2013.01); *B01D 2252/205* (2013.01); *B01D 2252/2023* (2013.01); *B01D 2252/2053* (2013.01); *B01D 2252/20484* (2013.01); *B01D 2257/306* (2013.01); *C02F 1/26* (2013.01); *C02F 2101/101* (2013.01); *C10G 2300/207* (2013.01); *C10L 2290/545* (2013.01)

(58) Field of Classification Search
CPC .. B01D 2252/205; C10G 21/16; C10G 29/22; C10G 29/20; C10G 29/24
USPC .......................... 252/184; 208/240, 237, 238
See application file for complete search history.

(56) References Cited

U.S. PATENT DOCUMENTS

| | | | |
|---|---|---|---|
| 4,680,127 A * | 7/1987 | Edmondson | ........... B01D 53/52 210/749 |
| 5,047,069 A | 9/1991 | Weers et al. | |
| 5,698,171 A | 12/1997 | Trauffer et al. | |
| 6,666,975 B1 | 12/2003 | Chen et al. | |
| 8,012,913 B2 | 9/2011 | Gatlin et al. | |
| 8,778,172 B2 | 7/2014 | Subramaniyam | |
| 9,068,269 B2 | 6/2015 | Keenan et al. | |
| 9,260,669 B2 | 2/2016 | Ramachandran et al. | |
| 9,273,254 B2 | 3/2016 | Compton et al. | |
| 9,587,181 B2 | 3/2017 | Lehrer et al. | |
| 2004/0096382 A1 | 5/2004 | Smith et al. | |
| 2012/0012507 A1 | 1/2012 | Compton et al. | |
| 2013/0240409 A1 | 9/2013 | Subramaniyam et al. | |
| 2014/0166282 A1 | 6/2014 | Martinez et al. | |
| 2015/0299100 A1 | 10/2015 | Kaplan | |
| 2017/0066977 A1 | 3/2017 | Rana et al. | |
| 2018/0093941 A1 | 5/2018 | Anantaneni et al. | |
| 2018/0216013 A1 | 8/2018 | Weers et al. | |

FOREIGN PATENT DOCUMENTS

| | | |
|---|---|---|
| EP | 1363985 A1 | 11/2003 |
| WO | 02051968 A1 | 7/2002 |
| WO | 2009035570 A1 | 3/2009 |

OTHER PUBLICATIONS

BASF Brochure; Intermediates Glyoxal from BASF as an H2S scavenger; date unknown, 8 pages.
BASF Brochure; Intermediates 1,3-Dioxolane; 2013, 12 pages.
Clariant Brochure; GPS Product Safety Summary for Glyoxlic Acid; Sep. 2011, 6 pages.
BASF Brochure; Glyoxal the Sustainable Solution for Your Business; 2008, 8 pages.
Freeman, James H.; "Synthesis of the Polymethylols of Phenol," J. Am. Chem. Sos., vol. 74, 1952, 6257-6260.

* cited by examiner

*Primary Examiner* — Thuan D Dang
(74) *Attorney, Agent, or Firm* — Mossman, Kumar & Tyler, P.C.

(57) ABSTRACT

Certain functionalized aldehydes scavengers may be used to at least partially scavenge sulfur-containing contaminants from fluid systems containing hydrocarbons and/or water. The contaminants scavenged or otherwise removed include, but are not necessarily limited to, $H_2S$, mercaptans, and/or sulfides. Suitable scavengers include, but are not necessarily limited to, reaction products of glycolaldehyde with aldehydes; reaction products of glycolaldehyde with a nitrogen-containing reactant (e.g. an amine, a triazine, an imine, an aminal, and/or polyamines); non-nitrogen-containing reaction products of a hydrated aldehyde with certain second aldehydes; reaction products of 1,3,5-trioxane with hydroxyl-rich compounds (e.g. glyoxal, polyethylene glycol, polypropylene glycol, pentaerythritol, and/or sugars); and reaction products of certain aldehydes with certain phenols; and combinations of these reaction products.

4 Claims, 1 Drawing Sheet

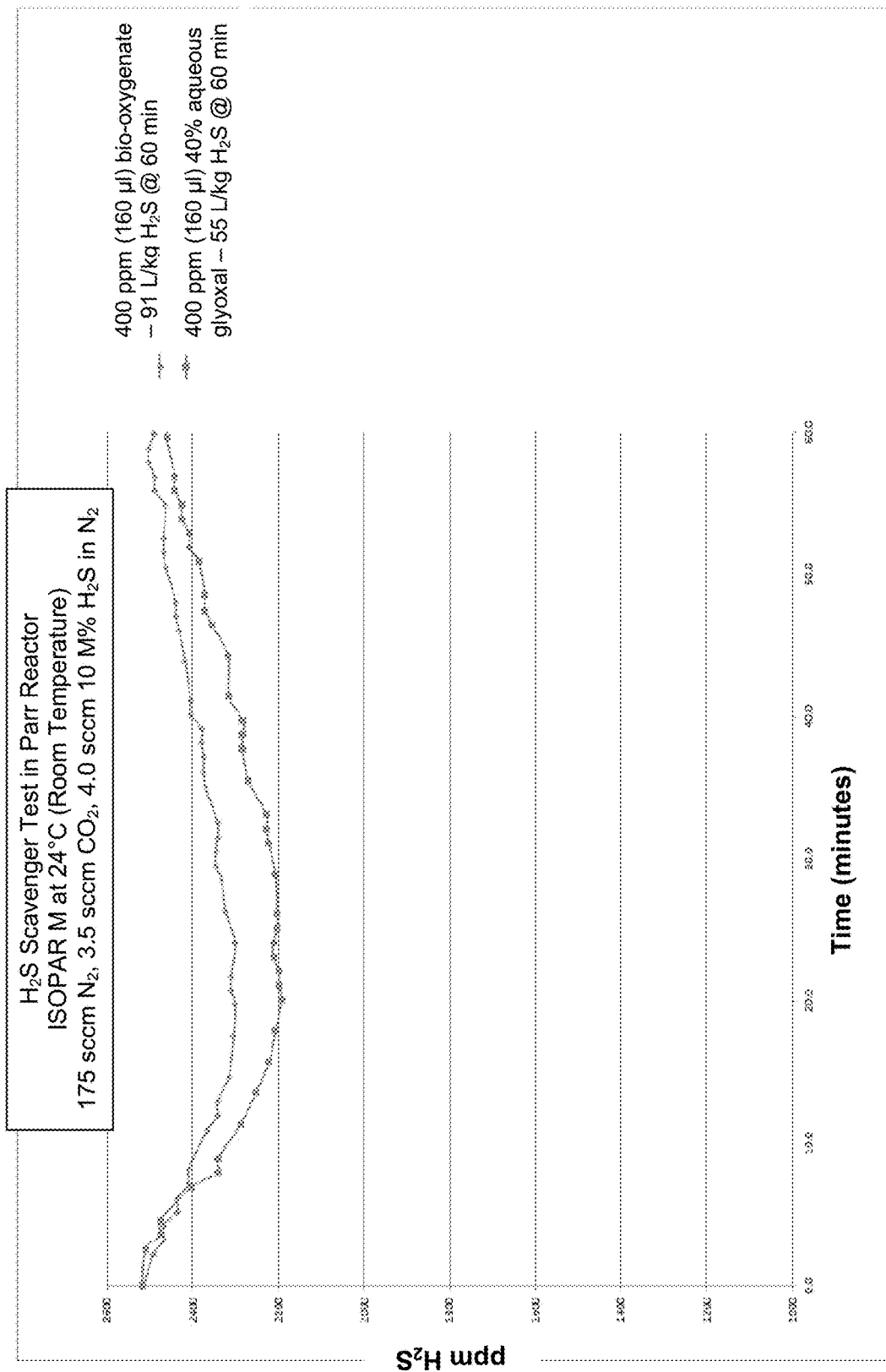

FUNCTIONALIZED ALDEHYDES AS H$_2$S AND MERCAPTAN SCAVENGERS

CROSS-REFERENCE TO RELATED APPLICATION

This application claims the benefit of U.S. Provisional Patent Application Ser. No. 62/453,789 filed Feb. 2, 2017, incorporated herein by reference in its entirety.

TECHNICAL FIELD

The present invention relates to methods and compositions for scavenging sulfur-containing contaminants from hydrocarbon-containing streams, and more particularly relates, in one non-limiting embodiment, to methods and compositions for scavenging H$_2$S and/or mercaptans from fluid systems comprising hydrocarbons containing these sulfur-containing contaminants, with or without the presence of water in these fluid systems.

BACKGROUND

In the drilling, completions, production, transport, storage, and processing of crude oil and natural gas, including waste water associated with crude oil and gas production, and in the storage of residual fuel oil, contaminants are often encountered. Such contaminants can be sulfur-containing and may include, but are not necessarily limited to, hydrogen sulfide (H$_2$S), mercaptans, and/or sulfides. The presence of H$_2$S and mercaptans is extremely objectionable because they are an acute health hazard and often highly corrosive. Still another reason that H$_2$S and mercaptans are undesirable is that they have highly noxious odors. The odors resulting from mercaptans are detectable by the human nose at comparatively low concentrations and are well known. For example, mercaptans in very small concentrations are used to odorize natural gas and used as a repellant by skunks and other animals.

Further, other of these contaminants in liquid hydrocarbons, hydrocarbon gas and/or mixed systems of hydrocarbons and water, including mixed production systems may cause various health, safety and environmental (HSE) concerns and/or corrosion issues during the production, storage, transportation and processing of oil and gas.

To eliminate these contaminants and potentially harmful species, various scavenger systems have been developed in the art. However, many of these systems have limitations, including, but not necessarily limited to, low reactivity and therefore low efficiency, containing atypical components or elements that may adversely affect fuel or fluid quality or are refinery catalyst poisons, or may present toxicity concerns themselves and/or as the consequent reaction products. Typical components include metals and certain amines such as monoethanolamine and methylamine as non-limiting examples. These materials limit the applicability of scavengers in refinery applications and thus are one of the drivers for why new non-triazine scavengers are needed.

It should be understood that nearly all scavenging systems for removing H$_2$S, mercaptans and/or sulfides from oil-based systems such as crude oil, oil slurries, asphalt, and the like, cannot be assumed to work in mixed production systems or dry and/or wet hydrocarbon gas systems or other mixed systems containing some water. A mixed production system may contain a hydrocarbon gas, such as natural gas. A "dry hydrocarbon gas system" is defined herein as a hydrocarbon gas produced from a subterranean formation having no more than about 7 lbs of water per mmscf (about 0.11 gr/m$^3$), alternatively no greater than about 1 lb of water per mmscf (about 0.016 gr/m$^3$), and in another non-limiting embodiment no greater than about 0.1 lbs of water per mmscf (about 0.0016 gr/m$^3$). "Wet hydrocarbon gas" is defined as a hydrocarbon gas (e.g. natural gas) that contains more than 7 lbs of water/mmscf (0.11 gr/m$^3$); in one non-limiting embodiment between about 50 independently to about 1,000 lbs water/mmscf (about 0.8 to about 16 gr/m$^3$); alternatively less than 10,000 lbs water/mmscf (160 gr/m$^3$). As defined herein "hydrocarbon" refers to naturally occurring hydrocarbons recovered from subterranean formations which are not necessarily limited to molecules having only hydrogen and carbon and which may include heteroatoms including, but not necessarily limited to oxygen, nitrogen, and sulfur.

In other words, it is not obvious or apparent that a scavenger that removes H$_2$S, mercaptans and/or sulfides from oil-based systems will do so for a mixed production system and/or a dry hydrocarbon gas system and/or a wet hydrocarbon gas system. Nearly all scavengers that work well for oil-based systems do not work, or do not work very well or very effectively for mixed production systems but might work for dry hydrocarbon gas systems and/or a wet hydrocarbon gas system; such scavengers include, and are not necessarily limited to, glyoxal, triazines and other amines. Many conventional H$_2$S scavengers such as triazine work poorly in mixed production systems where the water content is above 20%. In addition to low effectiveness of these scavengers in mixed production systems, scaling and/or solid formation issues are often encountered.

Alternatively, acrolein is the one well-known scavenger that is effective at scavenging H$_2$S, mercaptans and/or sulfides from oil-based systems as well as from a mixed production system, but acrolein is also well known to be very hazardous to handle and work with.

It would be desirable if methods and/or compositions could be devised that would, reduce, eliminate, take out or otherwise remove such contaminants from these liquid hydrocarbon systems, mixed production and/or dry hydrocarbon gas systems, as well as reduce, alleviate or eliminate corrosion caused by these undesired contaminants.

SUMMARY

There is provided a method for at least partially scavenging a sulfur-containing contaminant from a fluid system. The method includes contacting the fluid system with a scavenger in an effective amount to at least partially scavenge the sulfur-containing contaminant from the fluid system. The scavenger may include, but not necessarily be limited to, reaction products of glycolaldehyde with aldehydes and/or reaction products of glycolaldehyde with a nitrogen-containing reactant. Alternatively, the scavenger may include, but not necessarily be limited to, non-nitrogen-containing reaction products of a hydrated aldehyde with a second aldehyde. It is apparent that this range includes paraformaldehyde. In another non-restrictive version, suitable scavengers may include, but not necessarily be limited to, reaction products of 1,3,5-trioxane with a hydroxyl-rich compound. And in another non-limiting embodiment suitable scavengers may include reaction products of an aldehyde with a phenol. Finally, the method includes at least partially scavenging the sulfur-containing contaminant from the fluid system.

There is also provided a fluid system including a fluid disposed within the fluid system, where the fluid comprises a reaction product of a sulfur-containing contaminant and a scavenger as described above.

There is additionally provided in another non-limiting embodiment a treated fluid system treated for a sulfur-containing contaminant. The treated fluid system includes, but is not necessarily limited to, liquid hydrocarbons, hydrocarbon gas, mixtures of liquid hydrocarbons and water, and mixtures of hydrocarbon gas with water. The treated fluid system additionally includes a scavenger in an effective amount to at least partially scavenge the sulfur-containing contaminant from the fluid system, where the scavenger is any of those described above.

BRIEF DESCRIPTION OF THE DRAWINGS

FIG. 1 is a graph of $H_2S$ scavenged as a function of time for two different $H_2S$ scavengers, one of which is glyoxal (40% aqueous glyoxal) and the other which is a commercially available bio-oxygenate that is a commercially available glycolaldehyde.

DETAILED DESCRIPTION

It has been discovered that certain functionalized aldehydes react with or "scavenge" or otherwise remove $H_2S$, mercaptans, and/or sulfides, from systems comprising a fluid system selected from the group consisting of liquid hydrocarbons, hydrocarbon gas, mixtures of liquid hydrocarbons and water, and mixtures of hydrocarbon gas with water. As defined herein in one non-limiting embodiment, sulfides include salts of $H_2S$ such as sodium hydrosulfide (NaHS) or sodium sulfide ($Na_2S$). These fluid systems may include water or predominantly water with oil, that is, mixed production and dry hydrocarbon gas and a wet hydrocarbon gas, such as hydrocarbon gas streams having some water, or which are predominantly water, where these contaminants may be present and/or produced from any source. Many of these contaminants may over time and/or under certain conditions contact other reactants and form undesirable corrosive products.

As defined herein, a hydrocarbon gas includes, but is not necessarily limited to, natural gas, further including, but not limited to methane, ethane and include higher molecular weight fractions and gas condensate. The term "hydrocarbon gas" is not limited to chemical compounds having only hydrogen and carbon atoms, but may include chemicals customarily referred to as "hydrocarbons" including, but not necessarily limited to, petroleum, crude oil, natural gas, asphaltenes, constituent parts thereof and the like. Some of the hydrocarbon molecules may contain heteroatoms such as oxygen, nitrogen and sulfur, in addition to the carbon and hydrogen present.

In one non-limiting instance, contaminants such as hydrogen sulfide, mercaptans and sulfides are frequently present in many oilfield and refinery systems that comprise water and/or a hydrocarbon gas and/or liquid. Efforts to minimize or exclude the sulfides, mercaptans and hydrogen sulfide from such water-containing hydrocarbon gas systems and streams, particularly when water is a predominant part thereof, or where the hydrocarbon gas is essentially dry (having no appreciable water) are often ineffective or economically infeasible. Consequently, there is a need for another method and/or alternative scavengers for removing these contaminants from the systems or mixtures containing water or mixed production systems or a dry hydrocarbon gas and other such streams for health and environmental concern.

It will be appreciated that in the context herein, the term "scavenger" encompasses a component or additive, or a combination of components or additives, whether added to a stream separately or together, that scavenge one or more of the contaminants noted.

Scavenger chemistry described herein has been discovered to react with and "remove" these contaminants, that is, form a less-objectionable reaction product or products which may still remain in the stream but do not have the undesirable effects of the contaminant per se. For instance, the action of the scavenger on the contaminants effectively at least partially (or completely) converts them into thermally stable higher molecular weight compounds that are not as troublesome or objectionable.

It has been discovered that the scavengers described herein are effective in reacting with these contaminants to produce compounds or products that will no longer cause difficulty or concerns, or at least are less objectionable than the contaminants per se. It should be understood that the process is not technically "removing" the contaminant. By "removing", the contaminant is converted into a product that will prevent it from presenting more concerns and problems than the original contaminant. The reaction between the aldehyde-based scavenger and the contaminant will form a thermally stable product that does not cause or present such serious concerns or problems.

Functionalized Aldehyde Scavengers

In one non-limiting embodiment, the scavenger is a functionalized aldehyde. One specific approach is to react glycolaldehyde with formaldehyde to give polyoxymethylene having the formula $H(OCH_2)_nOCH_2CHO$, where n is an integer from 1 to 5. It is expected that as n is 6 or more solubility of the scavenger in the fluid system will be lost. In other words, the reaction products will start behaving like paraformaldehyde at high values of n, and paraformaldehyde is very insoluble in hydrocarbons and water.

Reactions of glycolaldehyde and hydrated aldehydes with other, different aldehydes, amines, and/or alcohols may be conducted under both acidic and basic conditions.

The reaction of other different aldehydes with the —OH (hydroxyl) group of glycolaldehyde or hydrated aldehydes gives an acetal/formal or hemiacetal/formal depending on the ratio of —OH to added aldehyde. Suitable aldehydes for reacting with glycolaldehyde or hydrated aldehydes include, but are not necessarily limited to, C1-C6 mono and di-aldehydes which in turn include, but are not necessarily limited to, formaldehyde, formaldehyde donors such as 1,3,5-trioxane or paraformaldehyde, acetaldehyde, butyraldehyde, benzaldehyde, glyoxal and glutraldehyde. The reaction of the aldehydes mentioned above will be with the —OH group of glycolaldehyde or the hydrated aldehydes. In one non-restrictive version, the aldehyde used to give the hydrated aldehyde is selected from the group consisting of glyoxal, acetaldehyde, propanal, butyraldehyde, glutaraldehyde and benzaldehyde, and the second aldehyde reacted with the hydrated aldehyde has a carbon number ranging from 1 to 50. It may be noted that this range includes paraformaldehyde, which may break down to smaller— $CH_2O$— units when it adds to the OH group of the hydrated aldehyde.

The mole ratio of aldehydes reacted with glycolaldehyde or hydrated aldehydes may range from 1:1 to 5:1; alternatively from 1:1 to 2:1.

In another non-limiting embodiment, glycolaldehyde and hydrated aldehydes may be reacted with nitrogen-containing reactants including, but not necessarily limited to amines, triazines, imines, aminals, polyamines having primary amine groups and/or secondary amine groups, and the like. The reaction of amines with glycolaldehyde will be with the carbonyl (—CHO) group. Triazines such as 1,3,5-hexahydrotriazines and imines could be formed by reactions of the aldehydes with primary amines. Aminals or hemiaminals could form by reaction of the aldehydes with secondary amines. Cyclic derivatives could be formed by reaction of the aldehydes with polyamines that include primary and secondary amino groups. In one non-limiting embodiment the amines are aliphatic amines having 12 carbons or less, for instance di-butylamine, among others. Suitable alkanolamines include, but are not necessarily limited to, ethanolamine or isopropanol amine. Suitable polyamines include, but are not necessarily limited to, ethylenediamine, diethylenetriamine, bis-hexamethylene diamine, and the like. In another non-restrictive version, the polyamine has five amino groups or less.

The mole ratio of amine reacted with glycolaldehyde or hydrated aldehydes may range from 1:1 to give imines or hemiacetals; alternatively from 2:1 to give aminals.

With respect to the scavenging ability of the aldehyde-derivative scavengers, the active portions of the molecules for scavenging are the aldehyde functionalities. Aldehyde derivatives are relatively slow acting when used as scavengers; thus in another non-limiting embodiment the scavenging proportion may range from about 0.1 to 3.0 mole ratio of aldehyde function to $H_2S$ or mercaptan (RSH functionality, where R is a hydrocarbon moiety) or sulfide functionality, where with a 1:1 mole ratio is also suitable.

In one sense, the reaction products described become a way to "package" relatively cheap formaldehyde into a reactive form.

bility of the scavenger is desired without the addition of amines. Reaction with polyaldehydes such as glyoxal (OCHCHO) is also possible. In these cases, each —CHRO— group is reactive toward sulfidic contaminants.

Glyoxal is acidic and exists in water as monomer (I), dimer (II), and trimer (III) forms having the structures shown below:

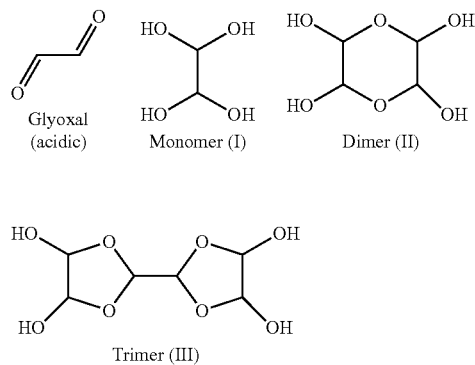

The polyhydric alcohols shown above are reacted with paraformaldehyde to obtain $H_2S$ scavengers as shown in the following reactions to give polyhydric structures of glyoxal reaction products with paraformaldehyde:

(Reaction A)

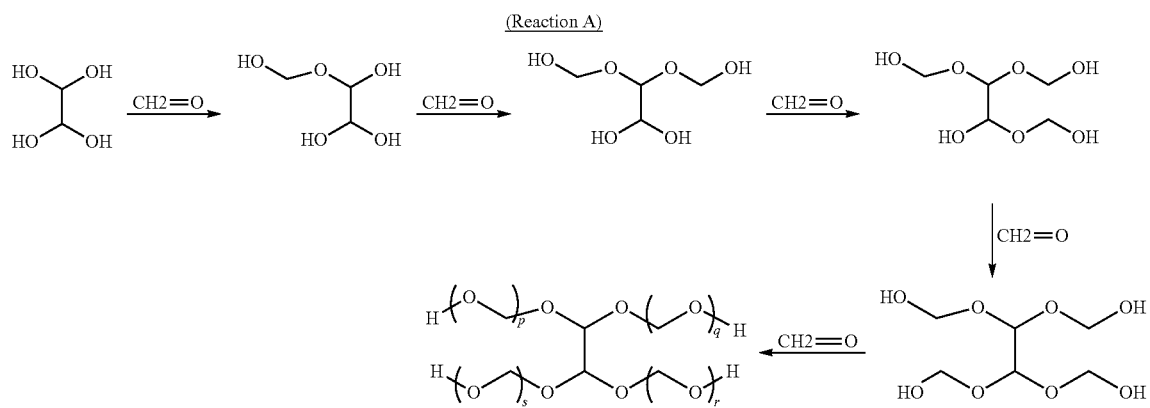

Glycolaldehyde is a multifunctional alcohol in that it also contains an aldehyde group which can either scavenge sulfidic species or it can potentially be used to make condensates such as triazines, imines, aminals or aminomethanes. The choice of the amine and the amount reacted will determine the type of condensate formed as well as the product's oil or water solubility.

The scavengers described above and elsewhere herein may be used by direct injection into the fluid system being treated, or alternatively may be used as an absorbent in equipment such as sparge towers where the scavenger contacts the sulfidic contaminants as they pass through the tower.

The acetal of glycolaldehyde can be prepared with aldehydes (acetaldehyde, propionaldehyde, butyraldehyde, benzaldehyde) other than formaldehyde if additional oil solu- It is believed that the prior art uses acetals of various types but that they all rely on aliphatic alcohols/glycols or alkanolamines. The derivatives described herein are not multifunctional in that glycolaldehyde described herein also contains the aldehyde group which is available as a scavenger or as another site to convert to amine condensates which can improve scavenger activity and modify oil/water solubility. Glycolaldehyde is also a so-called "green" product because it is derived by thermal treatment of sugars available from many natural sources.

Besides aldehydes, formalin, paraformaldehyde, and/or trioxane may also be used as sources of aldehyde to prepare the scavengers described herein. Trioxane may be used as a scavenger by itself. In addition, formaldehyde acetals (see the reaction below where both R groups are not hydrogen) or formaldehyde hemiacetals (see the reaction below where one R is hydrogen and the other R is alkyl). These materials could potentially be used as sources of formaldehyde as well by the reaction:

(Reaction B)

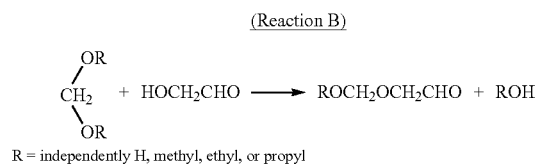

R = independently H, methyl, ethyl, or propyl

In certain situations H₂S and mercaptan scavengers for petroleum industry applications that do not utilize nitrogen containing chemicals are needed as there are concerns that the nitrogen in the scavengers will contribute to downstream issues. For example, the monoethanolamine used in common hexahydrotriazine-type scavengers is thought to contribute to crude unit corrosion issues. Thus, scavengers that can remove toxic hydrogen sulfide and mercaptans to improve the safe handling of petroleum based fluids which do not incorporate potentially harmful nitrogen compounds are needed. As described herein, acetals of hydrated aldehydes may be used to remove hydrogen sulfide from hydrocarbons fluids and water during use, transport and storage of the materials. These acetals are formed by reaction of an aldehyde (usually but not limited to formaldehyde, paraformaldehyde or an unsaturated aldehyde like acrolein) with glyoxal, glycolaldehyde or other hydrated aldehydes in water under acidic conditions. The reaction of the aldehyde with the —OH group of the hydrated aldehyde generates an acetal structure that is reactive toward sulfide species. The acetals will scavenge hydrogen sulfide alone, but the reaction may be catalyzed by the addition of an inorganic or organic base or a metal catalyst.

In more detail, the acetal chemistry of the scavengers herein may be formulated with catalyst (inorganic or organic bases) or metal ions (including, but not necessarily limited to copper (Cu), zinc (Zn), iron (Fe), and the like) to catalyze the reaction with sulfide species.

As mentioned previously, the scavenger may be injected into the process stream containing the hydrocarbon fluid or water, or alternatively it may be used in a contact tower where the fluid/water is passed through the scavenger solution which scrubs the H₂S, mercaptan, or sulfide from the fluid as it passes through the unit.

While, as noted, the acetal structure has been used as a scavenger in the past, such scavengers are usually based on simple alcohols or glycols. In contrast, as described herein, the starting material, a hydrated aldehyde e.g. glyoxal, is also a scavenger which gives increased scavenging capacity. Optionally, unsaturated aldehydes like acrolein may also be incorporated to give additional scavenging capacity.

In one non-limiting embodiment, glyoxylic acid, which is an aldehyde, is not used as a reactant to make the scavengers described herein; that is, there is an absence of glyoxylic acid.

1,3,5-Trioxane Derivatives as Scavengers

In a different embodiment sulfur-containing contaminant scavengers may be made by reacting 1,3,5-trioxane with —OH-rich (hydroxyl-rich) compounds like polyethylene glycol (PEG), glyoxal, and the like, typically in the presence of an acidic medium including, but not necessarily limited to, sulfuric acid (H₂SO4), hydrochloric acid (HCl), phosphoric acid (H₃PO₄), acetic acid (CH₃COOH), and the like to generate, for instance, a 1,3,5-trioxane-PEG reaction product useful as H₂S/mercaptan scavengers.

Suitable —OH-rich (hydroxyl-rich) compounds to react with 1,3,5-trioxane include, but are not necessarily limited to, glyoxal, polyethylene glycol (PEG), polypropylene glycol (PPG), pentaerythritol, sugars which in turn include, but are not necessarily limited to, sorbitol, erythritol, xylitol, and combinations of these sugars, and combinations of these hydroxyl-rich compounds.

The acidic media suitable for conducting the reactions to make these scavengers include, but are not necessarily limited to, inorganic acids (e.g. hydrochloric acid, sulfuric acid, phosphoric acid, and the like), organic carboxylic acids (e.g. acetic acid, propionic acid, and the like), sulfonic acids (e.g. toluene sulfonic acid, dodecylbenzene sulfonic acid, methane sulfonic acid, and the like) and also embodiments where the acid is added as a reagent to the reaction mixture and embodiments where the acid is attached to a solid support, in a non-limiting instance, in a strongly acidic ion exchange resin e.g. AMBERLYST® 15 resin. In one non-limiting embodiment the pH of the reaction should be less than 7.0.

In one non-restrictive version, in the reaction of the —OH-rich compound with the 1,3,5-trioxane, since the trioxane supplies three equivalents of formaldehyde per mole, and one mole of formaldehyde is needed per hydroxyl group, the mole ratio of 1,3,5-trioxane to the —OH-rich compound would be about 1 mole of 1,3,5-trioxane for every three moles of —OH in the —OH-rich compound.

With respect to the amount of 1,3,5-trioxane-derived scavenger that should be used to scavenge H₂S, mercaptan and/or a sulfide, each CH₂O group formed by the formaldehyde/—OH reaction is a potential scavenger. Thus, in one non-limiting embodiment a suitable mole ratio is 1 mole of H₂S per original —OH group, although as a practical matter, more than a 1:1 mole ratio of scavenger to H₂S (or mercaptan or sulfide) should likely be used.

In recent years nitrogen and metal based sour scavengers have come under high scrutiny. While nitrogen based scavengers have issues related to corrosion as well as solids formation, metal-based scavengers can be detrimental for refinery catalysts. Some of the other non-nitrogen chemistries like glyoxal suffer from an efficiency and kinetics standpoint. The 1,3,5-trioxane-derived scavengers described herein are non-nitrogen, non-metal sour scavengers, which are expected to have high efficiency at their stoichiometric limits.

Phenol Derivative Scavengers

In still another non-limiting embodiment suitable scavengers are formed by reacting an aldehyde, formaldehyde acetals, or formaldehyde hemiacetals with a phenol. Suitable aldehydes include, but are not necessarily limited to, formaldehyde, paraformaldehyde, 1,3,5-trioxane, glycolaldehyde, glyoxal, and mixtures thereof. Suitable phenols include, but are not necessarily limited to, phenol, catechol, resorcinol, mono-alkyl group substituted phenol where the alkyl group has from 1 to 12 carbon atoms, and mixtures thereof.

Careful control of the reaction conditions can result in polyhydroxyalkyl substituted monomeric phenols. By "careful control" is meant that the pH of the solution should be kept basic (defined as greater than 7.0). If the pH becomes acidic, the stability of the reaction product is decreased. Heating the additive to higher temperatures (above 60° C.) will result in phenol resin formation, which is undesirable.

In reacting the aldehyde and phenol, the molar ratio is 1-2 moles of aldehyde per reactive site on the phenol. For phenol, phenol can already react at the two ortho and one para positions to the —OH group. Note that with phenol, the reaction is on the benzene ring rather than on the OH group as mentioned above for alcohols. For alkyl-substituted phenols the reactions would still be at the free locations ortho or para to the OH group. Generally only two moles of aldehyde functionality reacts with each active site.

In still more detail, while the reaction of aldehydes with phenol is a well-known reaction pathway to form polymers, it is less known that careful control of the reaction conditions can result in poly-hydroxyalkyl substituted monomeric phenols. The reaction of phenol and aldehydes under basic conditions typically occurs at the two ortho and one para position of the phenol ring and one or more aldehydes can be added at each location. The phenolic —OH group can also be modified yielding a single monomeric product that contains many aldehyde adducts, each of which is potentially reactive toward hydrogen sulfide and/or mercaptans. Lab testing has shown that these materials are very active, aqueous based scavengers that do not contain triazine or other nitrogen bases. The scavengers work well in treating hydrocarbons or water and are especially suited for treatment of three phase systems commonly found in oilfield production. While not wanting to be limited by any particular reaction mechanism, some literature references suggest the hydroxyalkyl groups are labile and will "pop off" the phenol ring to form free aldehyde if the molecule is exposed to lower pH conditions such as those found downhole. Free aldehydes are well known $H_2S$ scavengers.

Certain patents to Statoil have described the use of various alcohols as ways to package aldehydes such as formaldehyde. In practice, only one or two aldehydes can be reacted with a mono alcohol. With polyols, cyclization reactions can occur which reduce the ability of the adduct to react with sulfides. The greater capacity to package aldehydes in reactive form offered by the phenol derivative scavengers described herein is an advantage over simple alcohols. Further, the cyclization reactions of polyols are not possible with this chemistry.

Again, the aldehyde functionality of the scavenger is what is active, so the ratio or dosage is one aldehyde functionality added to the phenol for each $H_2S$, although as mentioned above, as a practical matter, the mole ratio of scavenger to $H_2S$ (or mercaptan or sulfide) may need to be greater than 1:1.

The most active aldehyde for scavenging will be formaldehyde but others can also be used if improved oil solubility for example is desired. Longer chain aldehydes will also form hydroxyalkyl groups on the phenols and give lower performing but more oil soluble derivatives. Alkyl substituted phenols can also be used but they will reduce the amount of aldehyde that can be "packaged" into the molecule and thereby reduce the materials activity as a scavenger.

The method described above may be used to "package" large amounts of formaldehyde in a stable form that is reactive toward $H_2S$. These non-nitrogen based scavengers are suitable for multiple phase treatments like those used down hole where the pH conditions improve release of the scavenger. Nonalcoholic structures cannot form cyclic derivatives as the amount of aldehyde reacted is increased.

Additionally, aldehydes like formaldehyde are well known scavengers, but sometimes cannot be used because customers are concerned about its carcinogenic nature. Scavengers are thus desired that are not the free aldehyde but which can still retain the aldehyde's ability to react with and remove $H_2S$ and mercaptans from a variety of oilfield and refinery applications.

Further, in another non-restrictive version, dioxolane is not a scavenger; that is, there is an absence of dioxolane in the methods herein. For instance, EP 1363985 uses specific glycols with the right number of —$CH_2$— groups between the hydroxyls to make the cyclic dioxolane. In contrast, here the phenol reacts at the benzene ring and not the —OH group; phenols are not glycols. It is impossible to make the EP 1363985 chemistry with the starting materials described herein.

The reaction product scavengers described herein are novel chemistries envisioned to have high efficiency in scavenging $H_2S$ in sour oil/water or mixed oil/water environments in drilling fluids, servicing fluids, production fluids, completion fluids, injection fluids, and combinations thereof; downhole environment, flowlines, separators, refineries, waste water treatment units, and combinations thereof. The scavengers are also expected to be useful in refinery process streams and other applications including, but non-limited to, the processing and storage of hydrocarbons, treatment of aqueous streams include non-limiting examples such as wastewater treatment, sour water storage tanks, plant effluent storage ponds, slop oil processing and storage tanks containing finished products such as gasoline and diesel.

Typical application of the scavenger should allow sufficient time for the desired scavenging reaction to occur. In any event, sufficient time and/or conditions should be permitted so that the scavenger reacts with substantially all of the contaminant present. By "substantially all" is meant that no significant corrosion, safety, odor, and/or reactant problems occur due to the presence of the contaminant(s). In particular safety is an important reason for the use of scavengers to protect workers handling the hydrocarbons or water.

It will be understood that the complete elimination of $H_2S$, mercaptans and/or sulfides, odor or other problems or complete removal of the contaminants is not required for successful practice of the method. All that is necessary for the method to be considered successful is for the treated hydrocarbon liquid or gas (or such fluid system also containing water) to have reduced amounts of the contaminants as compared to an otherwise identical hydrocarbon, gas and/or aqueous stream having no aldehyde-based scavenger. Of course, complete removal of a contaminant is an acceptable result and desirable goal.

The invention will now be described with respect to particular Examples that are not intended to limit the invention but simply to illustrate it further in various non-limiting embodiments. Unless otherwise noted, all percentages (%) are weight %, and all dosages are ppm by volume.

Hydrogen Sulfide Scavenger Performance Evaluation

Tests were conducted by purging $H_2S$ into ISOPAR™ M (isoparaffinic fluid from ExxonMobil) at ambient temperature for four hours. 250 ml of the sour hydrocarbon was transferred into a 500 ml bottle containing the desired amount of scavenger and sealed. The containers were then placed in a shaker for desired time at ambient temperature or placed in an oven at 120° F. (49° C.) for the designated time, unless otherwise noted. The $H_2S$ contents in the headspace of the bottles were then measured using gas detector (Drager) tubes. For mixed productions testing, the procedure was followed with the exception that the test fluid used was a 70/30 ISOPAR™ M and 15.0 wt. % NaCl brine mixture, by volume. The brine was buffered with 200 mM sodium acetate-acetic acid to a pH of 4.7 and saturated with $CO_2$.

Example 1

Glyoxal itself (40% aqueous glyoxal) was tested against a commercially available bio-oxygenate (glycolaldehyde) using the above test. More specifically, the test was conducted in a Parr reactor using ISOPAR™ M isoparaffinic fluid at 24° C. (room temperature) using 175 sccm $N_2$, 3.5 sccm $CO_2$ and 4.0 sccm 10 M % $H_2S$ in $N_2$. The results are presented in FIG. 1, which is a graph of $H_2S$ scavenged as a function of time for the two different $H_2S$ scavengers. It may be seen that the bio-oxygenate was less effective than glyoxal; that is more $H_2S$ was removed over time with the glyoxal.

Examples 2-6

Synthesis Procedure—In a typical reaction, glyoxal is charged into a 4 necked flask equipped with overhead stirrer, thermocouple, addition funnel, and nitrogen inlet/outlet tubes. To the stirrer reactor, dodecylbenzenesulfonic acid catalyst (DDBSA) and paraformaldehyde were added and at ambient temperature. The contents were heated at 75° C. for 3 hours. The recipe for the reaction is shown in Table 1.

TABLE I

Recipe for Glyoxal-Formaldehyde Reaction

| Chemicals | Weight % |
| --- | --- |
| Glyoxal (40% in Water) | 80.53 |
| Paraformaldehyde | 18.97 |
| DDBSA (Catalyst) | 0.50 |

The performance data for glyoxal and its reaction product treated with formaldehyde, at two different dosages, is presented in Table II. The abbreviation RT is for room temperature

TABLE II

Performance Data for Glyoxal and Its Reaction Product Treated with Formaldehyde

| Product | Ex. | Dosage ppm | 4 Hour (RT) $H_2S$ ppm (% $H_2S$ Scavenged) | 24 Hour (RT) $H_2S$ ppm (% $H_2S$ Scavenged) | 4 Hour (120° F. (49° C.)) $H_2S$ ppm (% $H_2S$ Scavenged) |
| --- | --- | --- | --- | --- | --- |
| Blank | 2 | — | 5000 (0%) | 5000 (0%) | 5000 (0%) |
| 40% aqueous glyoxal | 3 | 500 | 2500 (50%) | 2000 (60%) | 1500 (70%) |
|  | 4 | 250 | 4000 (20%) | 3000 (40%) | 2000 (60%) |
| Glyoxal-Formaldehyde (1:1) Molar Reaction Product (50% dilution in water) | 5 | 500 | 550 (89%) | 400 (92%) | 1400 (72%) |
|  | 6 | 250 | 2500 (50%) | 1900 (62%) | 2100 (58%) |

It may be seen from the results of Table II that the glyoxal—formaldehyde (1:1 molar) reaction product scavenged $H_2S$ much more completely than did glyoxal alone in nearly all cases.

Example 7

IR data show the spectra of 1,3,5-trioxane (135T)—PEG200 (non-aqueous medium) reaction catalyzed by $H_2SO_4$. The reaction was followed by an increase of temperature from room temperature to 105° C. The reaction initiated at 95° C. and an exotherm occurred at about 100° C. In the Fourier Transform Infrared Spectroscopy (FT-IR) analysis, the peaks at 1157 (very distinct and intense peak), 965, and 928 $cm^{-1}$ were disappearing indicating the ring opening reaction. The formation of a new peak at about 1643 $cm^{-1}$ (water) indicated the condensation reaction between the —OH group of PEG200 and HO—$CH_2O$—$CH_2$— of ring opened the 135T to eliminate water. The disappearance of the peak at 883 $cm^{-1}$ may indicate that all the PEG200 reacted.

Examples 8-36

Synthesis of Phenol—Formaldehyde 1:3 and 1:6 Molar Reaction Products

The synthetic pathway is shown in Scheme I. The recipe for the 1:6 molar reaction products is shown in Table III. In a typical reaction, phenol (solid) was added into a 4 necked flask equipped with overhead stirrer, thermocouple, addition funnel, and nitrogen inlet/outlet tubes. The 45% KOH was added into the reactor and formalin (37%) was slowly added into the reaction mixture. The reaction temperature rose from 30 to 60° C. The contents were stirred at 60° C. for 4 hours.

Scheme I: Formation of H2S Scavenger Based on Phenol and Formaldehyde

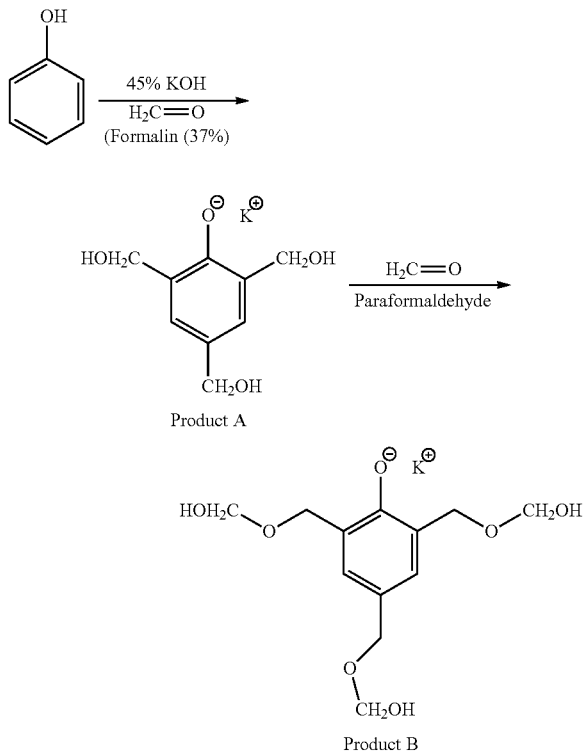

TABLE III

Recipe for Phenol-Formaldehyde 1:6 Molar Reaction Product

| Chemicals | Weight % |
|---|---|
| Phenol | 16.77 |
| Potassium Hydroxide (45%) | 22.24 |
| Formalin | 43.40 |
| Paraformaldehyde (U81) | 17.59 |
| Total | 100 |

Hydrogen Sulfide Scavenger Performance Evaluation

Performance data along with other scavengers are listed in Table IVa (Oil Only; 24 h; ambient temperature), Table IVb (Oil only; 4 h; ambient temperature), Table IVc (Oil Only; 4 h; 120° F. (49° C.)), and Table IVd (Mixed production; 24 h; 120° F. (49° C.)). As can be seen, the data clearly indicate the phenol—formaldehyde based product is more effective than the incumbent 40% aqueous glyoxal for the oil-only system.

TABLE IVa

Performance Data for Phenol:Formaldehyde (1:6 Molar Ratio) Oil Only at Ambient Temperature for 24 Hours

| Ex. | Product | Ratio | Dosage ppm | 24 Hours H2S, ppm | % Scavenged |
|---|---|---|---|---|---|
| 8 | Blank | — | — | 4000 | — |
| 9 | 40% aq. glyoxal | 2:1 | 2000 | 0 | 100% |
| 10 | 40% aq. glyoxal | 5:1 | 800 | 10 | 100% |
| 11 | 40% aq. glyoxal | 10:1 | 400 | 200 | 95% |
| 12 | phenol:Paraformaldehyde = 1:6 | 2:1 | 2000 | 0 | 100% |
| 13 | phenol:Paraformaldehyde = 1:6 | 5:1 | 800 | 0 | 100% |
| 14 | phenol:Paraformaldehyde = 1:6 | 10:1 | 400 | 100 | 98% |

TABLE IVb

Performance Data for Phenol:Formaldehyde Oil Only at Ambient Temperature for 4 h

| Ex. | Product | Ratio | Dosage ppm | 4 Hour H2S, ppm | % Scavenged |
|---|---|---|---|---|---|
| 15 | Blank | — | — | 5000 | — |
| 16 | 40% aq. glyoxal | 2:1 | 2500 | 1000 | 80% |
| 17 | 40% aq. glyoxal | 5:1 | 1000 | 1500 | 70% |
| 18 | 40% aq. glyoxal | 10:1 | 500 | 2000 | 60% |
| 19 | phenol:Paraformaldehyde = 1:6 | 2:1 | 2500 | 10 | 100% |
| 29 | phenol:Paraformaldehyde = 1:6 | 5:1 | 1000 | 30 | 99% |
| 21 | phenol:Paraformaldehyde = 1:6 | 10:1 | 500 | 400 | 92% |

TABLE IVc

Performance Data for Phenol:Formaldehyde Oil Only at 120° F. (49° C.) for 4 h

| Ex. | Product | Ratio | Dosage ppm | 4 Hour H2S, ppm | % Scavenged |
|---|---|---|---|---|---|
| 22 | Blank | — | — | 6000 | — |
| 23 | 40% aq. glyoxal | 2:1 | 3000 | 850 | 86% |
| 24 | 40% aq. glyoxal | 5:1 | 1200 | 2000 | 67% |
| 25 | 40% aq. glyoxal | 10:1 | 600 | 2500 | 58% |
| 26 | phenol:Paraformaldehyde = 1:6 | 2:1 | 3000 | 10 | 100% |
| 27 | phenol:Paraformaldehyde = 1:6 | 5:1 | 1200 | 300 | 94% |
| 28 | phenol:Paraformaldehyde = 1:6 | 10:1 | 600 | 1300 | 74% |
| 29 | phenol:Paraformaldehyde = 1:3 | 2:1 | 3000 | 100 | 98% |

TABLE IVd

Performance Data for Phenol:Formaldehyde (1:6 Molar Ratio) Mixed Production at 120° F. (49° C.) for 24 h

| Ex. | Product | Dosage ppm | 24 Hour H2S, ppm | % Scavenged |
|---|---|---|---|---|
| 30 | Blank | — | 5000 | — |
| 31 | 40% aq. glyoxal | 3000 | 2000 | 60% |
| 32 | 40% aq. glyoxal | 1000 | 2000 | 60% |
| 33 | 40% aq. glyoxal | 500 | 3500 | 30% |
| 34 | phenol:Paraformaldehyde = 1:6 | 3000 | 600 | 85% |
| 35 | phenol:Paraformaldehyde = 1:6 | 1000 | 2000 | 50% |
| 36 | phenol:Paraformaldehyde = 1:6 | 500 | 2500 | 38% |

Example 37

A 30% solution of 1,3,5-trioxane (135T) in water was tested and showed 33% scavenging as presented in Table V.

TABLE V

Performance Data for 1,3,5-Trioxane

| Product | Ratio | Dosage ppm | 24 Hr H2S, ppm | % Scavenged |
|---|---|---|---|---|
| 30% 1,3,5 Trioxane in water | 10:1 | 300 | 2000 | 33% |

The scavengers of the compositions and methods described herein have been shown to be effective in hydrocarbon systems, with or without the presence of water.

In the foregoing specification, the invention has been described with reference to specific embodiments thereof. The scavengers of this method would be expected to be useful in dry hydrocarbon gas, wet hydrocarbon gas, and/or predominantly water systems, e.g. mixed production systems, besides those explicitly mentioned. It will be evident that various modifications and changes can be made to the methods and compositions described herein without departing from the broader scope of the invention as set forth in the appended claims. Accordingly, the specification is to be regarded in an illustrative rather than a restrictive sense. For example, specific scavengers, reactants, reaction products, proportions thereof, mixed fluid systems, and contaminants falling within the claimed parameters, but not specifically identified or tried in particular compositions, are anticipated and expected to be within the scope of this invention.

The present invention may suitably comprise, consist or consist essentially of the elements disclosed and may be practiced in the absence of an element not disclosed. For instance, in a method for at least partially removing a sulfur-containing contaminant from a system comprising, consisting essentially of or consisting of a liquid hydrocarbons, hydrocarbon gas, mixtures of liquid hydrocarbons and water, and mixtures of hydrocarbon gas with water, the method may consist of or consist essentially of contacting the fluid system with a scavenger in an effective amount to at least partially scavenge the sulfur-containing contaminant from the fluid system, where the scavenger is selected from the group consisting of reaction products of glycolaldehyde with aldehydes, formaldehyde acetals, or formaldehyde hemiacetals; reaction products of glycolaldehyde with a nitrogen-containing reactant selected from the group consisting of an amine, a triazine, an imine, an aminal, polyamines having primary amine groups and/or secondary amine groups, and combinations thereof; non-nitrogen-containing reaction products of a hydrated aldehyde with a second aldehyde selected from the group consisting of formaldehyde, formaldehyde acetals, formaldehyde hemiacetals, paraformaldehyde, alkyl aldehydes, aryl aldehydes, polyaldehydes, and mixtures thereof, where the aldehyde of the hydrated aldehyde is selected from the group consisting of glyoxal, acetaldehyde, propanal, butyraldehyde, glutaraldehyde and benzaldehyde, and where the second aldehyde has a carbon number ranging from 1 to 50; reaction products of 1,3,5-trioxane with a hydroxyl-rich compound selected from the group consisting of glyoxal, polyethylene glycol, polypropylene glycol, pentaerythritol, sugars in turn selected from the group consisting of sorbitol, erythritol, xylitol, and combinations of these sugars, and combinations of these hydroxyl-rich compounds; and/or reaction products of an aldehyde with a phenol where: the aldehyde is selected from the group consisting of formaldehyde, formaldehyde acetals, formaldehyde hemiacetals, paraformaldehyde, 1,3, 5-trioxane, glycolaldehyde, glyoxal, and mixtures thereof; and the phenol is selected from the group consisting of phenol, catechol, resorcinol, mono-alkyl group substituted phenol where the alkyl group has from 1 to 12 carbon atoms, and mixtures thereof. Further the method may consist of or consist essentially of at least partially scavenging the sulfur-containing contaminant from the fluid system with the scavenger.

Further, a treated fluid system treated may consist of or consist essentially of liquid hydrocarbons, hydrocarbon gas, mixtures of liquid hydrocarbons and water, and mixtures of hydrocarbon gas with water; as well as one or more sulfur-containing contaminants, and a scavenger as described in the paragraph immediately above.

As used herein, the terms "comprising," "including," "containing," "characterized by," and grammatical equivalents thereof are inclusive or open-ended terms that do not exclude additional, unrecited elements or method acts, but also include the more restrictive terms "consisting of" and "consisting essentially of" and grammatical equivalents thereof. As used herein, the term "may" with respect to a material, structure, feature or method act indicates that such is contemplated for use in implementation of an embodiment of the disclosure and such term is used in preference to the more restrictive term "is" so as to avoid any implication that other, compatible materials, structures, features and methods usable in combination therewith should or must be, excluded.

As used herein, the singular forms "a," "an," and "the" are intended to include the plural forms as well, unless the context clearly indicates otherwise.

As used herein, the term "and/or" includes any and all combinations of one or more of the associated listed items.

As used herein, relational terms, such as "first," "second," "top," "bottom," "upper," "lower," "over," "under," etc., are used for clarity and convenience in understanding the disclosure and accompanying drawings and do not connote or depend on any specific preference, orientation, or order, except where the context clearly indicates otherwise.

As used herein, the term "substantially" in reference to a given parameter, property, or condition means and includes to a degree that one of ordinary skill in the art would understand that the given parameter, property, or condition is met with a degree of variance, such as within acceptable manufacturing tolerances. By way of example, depending on the particular parameter, property, or condition that is substantially met, the parameter, property, or condition may be at least 90.0% met, at least 95.0% met, at least 99.0% met, or even at least 99.9% met.

As used herein, the term "about" in reference to a given parameter is inclusive of the stated value and has the meaning dictated by the context (e.g., it includes the degree of error associated with measurement of the given parameter).

What is claimed is:

1. A fluid system comprising:
a fluid disposed within the fluid system, where the fluid comprises a reaction product of a sulfur-containing contaminant and a scavenger selected from the group consisting of:
non-nitrogen-containing reaction products of a hydrated aldehyde with a second aldehyde in the presence of a catalyst, where the second aldehyde is selected from the group consisting of formaldehyde, formaldehyde acetals, formaldehyde hemiacetals, paraformaldehyde, alkyl aldehydes, aryl aldehydes, polyaldehydes, and mixtures thereof, where the aldehyde of the hydrated aldehyde is selected from the group consisting of glyoxal, acetaldehyde, propanal, butyraldehyde, glutaraldehyde and benzaldehyde, and where the second aldehyde has a carbon number ranging from 1 to 50.

2. The treated fluid system of claim 1 where the sulfur-containing contaminant is selected from the group consisting of hydrogen sulfide, mercaptans, and mixtures thereof.

3. The treated fluid system of claim 1 where an amount of scavenger present in the fluid is a mole ratio of scavenger to sulfur-containing contaminant of 0.1:1 to 3.0:1.

4. The treated fluid system of claim 1 where the fluid system is selected from the group consisting of selected from the group consisting of liquid hydrocarbons, hydrocarbon gas, mixtures of liquid hydrocarbons and water, and mixtures of hydrocarbon gas with water.

* * * * *